United States Patent Office 3,480,549
Patented Nov. 25, 1969

3,480,549
CUTTING OIL COMPOSITIONS CONTAINING A MINERAL LUBRICATING OIL BASE AND A POLYDIENE-POLYHALOMETHANE ADDUCT
Donald D. Carlos, Crown Point, Ind., and David W. Young, Homewood, Ill., assignors to Sinclair Research, Inc., New York, N.Y., a corporation of Delaware
No Drawing. Filed Nov. 9, 1966, Ser. No. 592,972
Int. Cl. C10m 1/30, 3/24, 5/18
U.S. Cl. 252—54    9 Claims

ABSTRACT OF THE DISCLOSURE

Cutting oil compositions are provided comprising a mineral lubricating oil base as the major component and a small amount, effective to enhance cutting, e.g. effective to reduce feed force when used in the machining of metals, of an adduct of a polymer of a diene, such as a hydroxyl-containing diene polymer, and a polyhalomethane. The latter component has no more than two fluorine atoms, and can be, for example, carbon tetrachloride or chloroform. The diene polymer has a Staudinger molecular weight of about 200 to 25,000, and the adduct contains about 1 to 35 weight percent of halogen of said polyhalomethane. Said adduct is formed by free radical initiation.

This invention relates to oil compositions, especially cutting oil compositions, which contain a novel diene polymer product, as well as to the novel diene polymer product itself.

We have found that base-oil soluble polymer products obtained by the reaction of a diene polymer and a polyhalomethane when added to a base mineral lubricating oil, provide an oil composition particularly useful when machining metals. For instance, when employed in a metal-tapping operation, the oil composition of the invention effects a substantial reduction in express tapping torque. The hydrocarbon nature of the diene polymer backbone of the novel polymer products permits blends to be made with a variety of base oil stocks. Further, because of the microstructure of these diene polymeric products the oil compositions of the present invention do not show undue drying rates and thus present no serious storage problems. In general, the diene polymer product-containing cutting oils of the present invention can be used in a wide range of machining operations such as drawing, extruding, tapping, reaming, broaching, grinding, threading, etc.

The novel polymer products used in the cutting oil compositions of the present invention are the addition products of halogenated methanes and diene polymers. Suitable diene polymers include liquid polybutadiene resins obtained by the various catalytic diene polymerization processes, for example, liquid polybutadiene resins prepared by processes employing a sodium catalyst such as the process described in U.S. Patent 2,631,175 to Crouch, or a $BF_3$-etherate catalyst system, such as the process described in U.S. Patent 2,708,639 to Miller. The preferred diene polymer used to prepare the novel polymer products of the present invention is a hydroxyl-containing polymer oil generally having on the average at least about 1.8 predominantly primary, terminal, i.e., attached to a terminal carbon atom, hydroxyl groups per polymer molecule. Most advantageously, the polymer has greater than two average allylic, terminal hydroxyl groups, e.g., at least 2.1 to, say 2.6, or even 3 or more.

Also, two terminal hydroxyls are generally separated by a long carbon-carbon chain. Determined as milli-equivalents of potassium hydroxide equivalent to the hydroxyl content of one gram of polymer, the polymers will often have a hydroxyl value of about 0.5 to 1.5, preferably 0.7 to 1.0. The hydroxyl-containing diene polymers used in the present invention may have number average molecular weights in the range of about 200 to 25,000 (Staudinger) and viscosities at 30° C. of about 5 to 20,000 poises and may be prepared using a hydrogen peroxide catalyst. This free-radical addition polymerization usually takes place in a mutual solvent system; that is, one which dissolves both the diene monomer and the hydrogen peroxide. Suitable solvents are isopropanol, acetone, methanol, sec-butanol, n-butanol, n-propanol and like alcohols having 2 to about 12 carbon atoms. The $H_2O_2$-solvent system is found to supply hydroxyl groups and the catalytic and solvent effects needed to produce the diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymer. The alcohol will be free of any group which would interfere with the production of the diene polymer. Saturated alcohols are preferred and often those having about the same carbon atom content as the diene monomer will be found most useful. For example, when the monomer is butadiene, propanol, or isopropanol may be preferred. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 to 10 percent of the reaction mixture to assure a low molecular weight addition polymer product having the desired number of hydroxy groups per molecule. The resulting hydroxyl-containing diene polymers are predominantly linear, i.e., 1,4-polymers in the case of butadiene-1,3 and thereby differ from those non-hydroxyl-containing diene polymers produced, for example, by sodium catalysis. The preferred polymers will often be in the molecular weight range of about 1200 to 7000 with viscosities at 30° C. of about 15 to 5000 poises. The preferred diene polymers also have the majority of their unsaturation in the main hydrocarbon chain.

The diene hydrocarbons which are employed to make the polymers are unsubstituted, 2-substituted or 2,3-disubstituted-1,3-dienes of up to about 12 carbon atoms. The diene preferably has up to 6 carbon atoms and the substituents in the 2- and/or 3-position may be hydrogen, alkyl, generally lower alkyl, e.g., of 1–4 carbon atoms, aryl (substituted or unsubstituted), halogen, nitro, etc. Typical dienes which may be employed are 1,3-butadiene, isoprene, chloroprene, 2 - cyano - 1,3 - butadiene, 2,3-dimethyl-1,3-butadiene, etc.

Mono-olefinically unsaturated monomers may also be incorporated into the diene polymers used in this invention. Generally, they will be present only in minor amounts but may be present in up to about 40 percent by weight of the total monomers. Usable vinylidene monomers include alpha-mono-olefinic materials of about 2 or 3 to 10 or 12 carbon atoms such as styrene, vinyl toluene, methylmethacrylate, methacrylate, acrylic esters, acrylonitrile, vinyl chloride, etc.

To cite an example of the chemical structure of the preferred diene polymer useful in this invention, a simplified structural formula of polybutadiene may be given as:

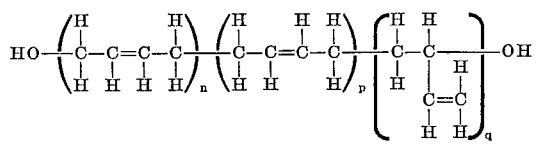

in which $n$ plus $p$ is greater than $q$, that is, the in-chain unsaturation accounts for more than 50% of the unsaturation. One or more of the H atoms appearing in the above formula will be replaced by hydroxyl in at least some of the molecules. This formula should not be understood as implying that the polymers are necessarily in blocks, but the cis-1,4-, trans-1,4- and vinyl (1,2) unsaturation are usually distributed throughout the polymer molecule. The letter $n$ may be a number sufficient to give a cis-1,4-unsaturation content of about 10–30 percent; $p$ may be a number sufficient to give a trans-1,4-unsaturation content to the polymer in the range of about 40–70 percent while $q$ may be sufficient to give a pendant 1,2-vinyl unsaturation of about 10–35 percent. Often the polymer will contain largely trans-1,4-units, e.g., about 50–65 percent, and about 15–25 percent cis-1,4-units, with about 15–25 percent 1,2-units. Branching may also occur in the above polymers, especially those prepared at higher temperatures. It should be emphasized, however, that the present invention is not limited to the use of hydroxyl-containing diene polymers, nor of hydroxyl-containing polymers having the predominating trans-1,4-structure, although such are highly preferred in preparing the novel polymer products.

The term "polyhalomethane" as used here and in the claims includes methanes having at least two, preferably three or four, hydrogen atoms replaced by a halogen, but not more than 2 fluorine atoms. Further, the term includes polyhalomethanes substituted with same or different halogens. Suitable polyhalomethanes include, for example, dihalomethanes, such as dichloromethane, dibromomethane, chlorobromomethane, etc.; trihalomethanes, such as tribromomethane, triiodomethane, chlorodifluoromethane, etc.; tetrahalomethanes, such as tetrachloromethane, tetraiodomethane, dichlorodibromomethane, etc.; as well as mixtures thereof.

The addition reaction of the polyhalomethane and the diene polymer is believed to proceed through a free radical chain mechanism and may be initiated, it has been found, by using peroxide catalysts or by irradiation with light of suitable wave length. The reaction may be carried out at reflux temperature or at higher temperatures in an autoclave. Contingent upon the half-life of the initiator, reaction time may be extended at lower temperatures or curtailed at higher temperatures, but in general the reaction time may be up to about 24 hours or more. In general, the polyhalomethane may be used as a solvent for the olefinic material in the reaction, but other solvents such as toluene, heptane, ortho-dichlorobenzene, etc., may be used, for example, in cases where the polyhalomethane used is a solid. Further, a batch process or a continuous process may be used.

The novel polymer products of the invention are clear, colorless oils which possess excellent oil solubility. The halogen content of these addition products may vary considerably depending upon reaction time, temperature and conditions, but often the novel products may contain about 1 to 35 wt. percent of halogen, preferably about 5 to 20%, from the polyhalomethane.

The oils used as the base and major component in the cutting oils of the present invention are mineral lubricating oils. The oils used include the petroleum lubricating oils such as refined coastal oils and refined Mid-Continent oils. The oils may be refined by acid treatment, solvent extraction, hydrogenation or other procedures. Although various oils of lubricating viscosity can be used in the products of our invention, it is preferred to use a substantially anhydrous lubricating oil with a viscosity from about 50 to 2000 SUS at 100° F., preferably 70 to 500 SUS at 100° F. Good results have been obtained with an acid-refined coastal oil with a viscosity of about 100 SUS at 100° F.

The amount of the novel polymer product added to the base oil employed may depend upon the particular base oil employed and the machining operation in which the cutting oil is used. However, in all cases the amount will be that sufficient to enhance cutting, for example, effectively reduce feed force. Often the amounts will fall within the range of about 1 to 50 by weight, preferably 2 to 20 by weight, based on the mineral oil.

Additional optional additives may be used in small amounts in the cutting oil compositions of the invention such as bactericides, corrosion inhibitors, anti-foam agents, etc. Moreover, they may be used either alone or in combinations, for instance, in an amount of about 0.5–1 percent by weight.

The following examples will further illustrate the present invention, but are not to be considered limiting.

Example I

To a glass bottle containing 10 parts of aqueous (50% by weight) hydrogen peroxide were added 70 parts isopropanol and 100 parts butadiene-1,3. The bottle was capped and placed in a steam pressure chamber and held at 118° C. for two hours. After cooling, the bottle was opened and the volatiles were removed, e.g., butadiene-1,3, butadiene dimer, isopropanol, acetone, residual hydrogen peroxide, water, etc. This removal was accomplished with the aid of heat and vacuum followed by steam and vacuum. The resulting product was a clear, viscous liquid polybutadiene having a hydroxyl value of 0.95 meq./g., about 2.2 terminal, allylic hydroxyl groups (predominantly primary) per molecule, a molecular weight of approximately 2200, a viscosity of 50 poises, and an iodine number of over 300.

Example II

A 450 cc. pressure bottle was charged with 400 g. of carbon tetrachloride, 75.0 g. of the polybutadiene oil prepared in Example I and 4.0 g. of benzoyl peroxide. The bottle was sealed and placed in the Launder-ometer at 70° C. and turned for 16 hours. The reaction mixture was transferred to a suction flask and stripped under reduced pressure to a constant weight of 98.0 g. product which upon X-ray analysis showed a chlorine content of 17.0%.

Example III

Similarly, 400 g. of chloroform, 75.0 g. of the polybutadiene oil prepared in Example I and 4.0 g. of benzoyl peroxide were charged to a 450 cc. pressure bottle and turned for 16 hours at 70° C. There resulted 87.3 g. of clear, viscous oil which was shown by X-ray analysis to contain 7.40% chlorine.

Example IV

The polyhalomethane-polybutadiene addition products obtained in Examples II and III, designated Addition Product A and Addition Product B, respectively, were evaluated for torque reduction properties by adding a small amount of each of the products to a mineral lubricating oil base stock and subjecting the resulting mixtures to a metal tapping test using 1117 SAE steel. For comparison, a test run was made initially using the mineral lubricating oil containing no polymer product. The base mineral lubricating oil used in the tests was an acid refined coastal mineral lubricating oil having a viscosity of 100 SUS at 100° F. The results are listed below:

Results of tapping tests on 1117 SAE steel

|  | Torque in inch-pounds |
|---|---|
| Acid-Refined Coastal Oil (100 SUS at 100° F.) | 465 |
| 5% of Addition Product A in Acid Refined Coastal Oil (100 SUS at 100° F.) | 362 |
| 5% of Addition Product B in Acid Refined Coastal Oil (100 SUS at 100° F.) | 371 |

The results show that notable torque reduction is effected when tapping steel, as a result of the addition of a small amount of the polyhalomethane-diene polymer product to the base mineral lubricating oil. Different polymer product concentrations and base mineral oil stocks may be desirable, however, when the cutting oil compositions are employed in other industrial machining operations, such as drawing or extruding.

It is claimed:

1. A cutting oil composition comprising a mineral lubricating oil base as the major component and a small effective amount, sufficient to reduce feed force when the composition is used in the machining of metals, of an adduct of a polymer of a diene of about 4 to 12 carbon atoms and a polyhalomethane having no more than two fluorine atoms, said diene polymer having at least about 1.8 predominantly primary, terminal hydroxyl groups per polymer molecule and a Staudinger molecular weight of about 200 to 25,000 and said adduct containing about 1 to 35 weight percent of halogen of said polyhalomethane, said adduct being formed by free radical initiation.

2. The composition of claim 1 wherein the diene is 1,3-butadiene.

3. The composition of claim 2 wherein the diene polymer has the majority of its unsaturation in the main hydrocarbon chain.

4. The composition of claim 3 wherein the diene polymer has about 2.1 to 2.6 predominantly primary, allylic, terminal hydroxyl groups per polymer molecule and a Staudinger molecular weight of about 1200 to 7000.

5. The composition of claim 4 wherein the polyhalomethane is carbon tetrachloride.

6. The composition of claim 4 wherein the polyhalomethane is chlorofrom.

7. The composition of claim 1 wherein the adduct is present in an amount of about 1 to 20 weight percent of the mineral oil.

8. A cutting oil composition comprising a mineral lubricating oil base as the major component and a small effective amount, sufficient to reduce feed force when used in the machining of metals, of an adduct of a polymer of a diene of about 4 to 12 carbon atoms and a polyhalomethane having no more than two fluorine atoms, said diene polymer having a Staudinger molecular weight of about 200 to 25,000, and said adduct containing about 1 to 35 weight percent of halogen of said polyhalomethane, said adduct being formed by free radical initiation.

9. The composition of claim 8 wherein the diene is 1,3-butadiene.

References Cited

UNITED STATES PATENTS

| 2,755,224 | 7/1956 | Young et al. | 252—58 XR |
| 2,798,853 | 7/1957 | Young et al. | 252—58 XR |

DANIEL E. WYMAN, Primary Examiner

W. CANNON, Assistant Examiner

U.S. Cl. X.R.

252—58; 260—94.7